United States Patent [19]

McCrary et al.

[11] 3,726,912
[45] Apr. 10, 1973

[54] SUBSTITUTED ALKANOLAMINE CHELATING AGENTS

[75] Inventors: Avis L. McCrary; David A. Wilson, both of Lake Jackson, Tex.

[73] Assignee: The Dow Chemical Company, Midland, Mich.

[22] Filed: July 2, 1970

[21] Appl. No.: 52,102

[52] U.S. Cl. .................................260/513 N, 71/27
[51] Int. Cl. ..............................C07c 143/04, C07c, 143/10, C07c, 12
[58] Field of Search ...............................260/513 N

[56] References Cited
UNITED STATES PATENTS

| | | | |
|---|---|---|---|
| 3,091,522 | 5/1963 | Hemwall | 260/513 N |
| 2,532,391 | 12/1950 | Bersworth | 260/513 N |

*Primary Examiner*—Daniel D. Horwitz
*Attorney*—Griswold and Burdick, D. H. Thurston and C. E. Rehberg

[57] ABSTRACT

Hydroxyalkylated alkylenediamines and polyalkylenepolyamines wherein the amino hydrogen atoms have been replaced by carboxymethyl radicals and at least are 2-hydroxy-3-sulfopropyl radical are effective iron chelating agents useful for promoting plant growth. The compounds are particularly effective for chelating iron at relatively high pH levels.

8 Claims, No Drawings

SUBSTITUTED ALKANOLAMINE CHELATING AGENTS

BACKGROUND OF THE INVENTION

This invention pertains to new chemical compounds and to their use in promoting the growth of plants by supplying necessary metal nutrients in an available form.

Plants are known to require a number of metallic elements in the soil for proper growth and development. Metals such as potassium, magnesium, and iron are particularly important although the actual quantities needed by plants may be small or even trace amounts. However, the metal must be present in at least slightly soluble form to be available to plants. In the case of iron, the problem of iron deficiency often arises in alkaline soils where there may be plenty of iron present, but it is all in the form of insoluble oxide or hydroxide. Plants growing in such soils thus can suffer from a lack of what surrounds them in useless abundance, a case of "water, water, everywhere nor any drop to drink."

An effective means for correcting an iron deficiency problem has been the addition to the soil of a chelating agent, a compound which is capable of binding and solubilizing iron which would otherwise be unavailable for plant nutrition. When iron is already present in the soil, only the chelating compound itself need be added, but if the soil is deficient in iron, the metal can be added in combination with the chelating agent, preferably as the preformed iron chelate. In the past, phenolic compounds such as derivatives of salicylaldehyde and substituted amines such as carboxylated ethylenediamine have been used for the purpose. Hemwall, U.S. Pat. No. 3,091,522, describes the use of alkylenediamines and polyalkylenepolyamines having carboxymethyl groups plus a limited number of 2-hydroxy-3-sulfopropyl groups as substituents on the nitrogen atoms. A number of patents describe alkylenepolyamines having hydroxyalkyl and carboxymethyl substituents as chelating agents for iron, see particularly Bersworth, U.S. Pat. No. 2,673,214; Kroll, U.S. Pat. No. 2,859,104; and Young, U.S. Pat. No. 2,808,435. Such compounds are effective chelating agents for iron under most conditions, but their chelating capacity drops off at higher pH levels.

SUMMARY OF THE INVENTION

Iron chelating agents have now been found which offer superior capacity for chelating iron over a broad range of pH and which have particular advantage over related known compounds at high pH values. These new compounds have the following formula:

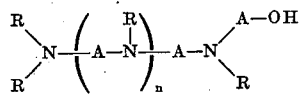

wherein $n$ is 0–5, A is an alkylene radical of 2–3 carbon atoms, and each R is a carboxymethyl radical, a hydroxyalkyl radical of the formula —A—OH, or a 2-hydroxy-3-sulfopropyl radical, at least one R being a 2-hydroxy-3-sulfopropyl radical. These compounds or their water-soluble salts can be added to soils deficient in available iron as such, for example, as a water solution, but they are preferably added as their iron chelate dispersed in or supported on an inorganic carrier or a fertilizer composition. When iron is already present in the soil although in a form not readily available to plants, only the compounds themselves or preferably their water-soluble salts such as the alkali metal or ammonium salts need be added, since the iron chelate will then form in the soil.

DETAILED DESCRIPTION

In the family of compounds defined by the above general formula, A can be propylene, trimethylene, or ethylene and it is preferably the latter. Compounds of the invention, therefore, include substituted derivatives as defined of N-(2-aminoethyl)ethanolamine, N,N'-ethylene-bis(ethanolamine), N-(2-hydroxyethyl)trimethylenediamine, N-(2-hydroxypropyl)propylenediamine, N-(2-hydroxyethyl)-diethylenetriamine, dihydroxyethylated diethylenetriamine, and similar hydroxyethylated and hydroxypropylated polyamines such as triethylenetetramine, tetrapropylenepentamine, and hexaethyleneheptamine.

The R substituents are defined as carboxymethyl radicals which have the formula —$CH_2CO_2H$, as hydroxyalkyl radicals of the formula —A—OH, or as 2-hydroxy-3-sulfopropyl radicals which have the formula —$CH_2CHOHCH_2SO_3H$. It is to be understood that in this specification and in the claims, the terms carboxymethyl and 2-hydroxy-3-sulfopropyl are used to include both the acid forms illustrated above and their obvious equivalents, the water-soluble salts such as the ammonium and alkali metal salts, particularly the sodium and potassium salts.

The compounds of the invention can be prepared by any of several broadly conventional procedures. The sulfonate groups can be substituted on the polyamine molecule by reacting the polyamine in aqueous medium with 3-chloro-2-hydroxypropanesulfonic acid or a salt thereof or with an equivalent reagent such as a 2,3-epoxypropane-sulfonate or the 3-sultone of 2,3-dihydroxypropanesulfonic acid. Preferably, sodium 3-chloro-2-hydroxypropane-sulfonate is reacted with the polyamine in the desired proportion at about 70°–105° C in the presence of excess sodium hydroxide or the caustic can be added during or after reaction of the amine with the sulfonate. The reaction is desirably carried out in water solution, but less than the quantity of water necessary to dissolve all the reactants can be used.

Similarly, carboxymethylation of the polyamine can be accomplished by any of several conventional and equivalent procedures. Aqueous sodium cyanide and formaldehyde are reacted in equivalent or slight excess over the stoichiometric quantities with the polyamine compound at about 80°–105° C in a preferred procedure. Carboxymethylation can also be done using a combination of glycolonitrile and an alkali hydroxide. The carboxymethylation reaction in either case includes a final hydrolysis step, for example, reflux of the aqueous mixture for several hours.

Ordinarily, the sulfonate group substitution reaction is carried out first, then the remaining amine hydrogen atoms are replaced by carboxymethyl groups. The reactions can also be carried out in reverse order.

When both the sulfonate group substitution and the carboxymethylation reactions are run, the reaction product is a mixture, probably of all possible isomeric distributions of the two substituents on the polyamine molecule. However, since the chelating properties of these isomeric compounds are substantially the same, the isolation of a particular isomeric is of no importance in the use of the compounds as chelating agents.

EXAMPLE 1

A solution of 51 g. of N-(2-hydroxyethyl)ethylenediamine, 42 g. of NaOH, and 196 g. of sodium 3-chloro-2-hydroxypropanesulfonate in 417 g. of water was heated at 80°–90° C for 2 hours, then the temperature was raised to 95° C and 137 g. of 30 percent aqueous NaCN and 120 g. of 23 percent aqueous formaldehyde were simultaneously pumped into the reaction mixture over a 2 hour period. After the addition, the resulting solution was heated at reflux temperature for 10 hours. The product was essentially a water solution of sodium chloride plus the starting diamine in which the three amine hydrogen atoms had been replaced by two 2-hydroxy-3-sulfopropyl groups and one carboxymethyl group, both groups present as the sodium salts. The isomeric compounds, the trisodium salts of N-carboxymethyl-N-(2-hydroxyethyl)-N',N'-bis(2-hydroxy-3-sulfopropyl)ethylenediamine and N-carboxymethyl-N'-(2-hydroxyethyl)-N,N'-bis(2-hydroxy-3-sulfopropyl)ethylenediamine constituted the bulk of the organic product. The cooled product solution was diluted with water to a volume of 1 liter for iron chelating testing at various pH levels. The extent of iron chelation was determined by colorimetric iron analysis using 1,10-phenanthroline, see Sandell, Colorimetric Determination of Traces of Metals, vol. 3, Interscience, New York (1959), pages 537 and 541, also Snell et al., Colorimetric Methods of Analysis, vol. 2, Van Nostrand, New York (1949), page 316.

EXAMPLES 2–3

Using the procedure of Example 1, N-(2-hydroxyethyl)ethylenediamine was reacted with half the above proportion of sodium 3-chloro-2-hydroxypropanesulfonate and correspondingly more cyanide and formaldehyde to make the substituted diamine containing one sulfonate group and two carboxymethyl groups per molecule. The product was essentially a mixture of the isomeric compounds, the trisodium salts of N,N'-bis(carboxymethyl-N-(2-hydroxyethyl)-N'-(2-hydroxy-3-sulfopropyl)ethylenediamine and N,N-bis(carboxymethyl)-N'-(2-hydroxyethyl)-N'-(2-hydroxy-3-sulfopropyl)ethylenediamine. In the same way, the starting diamine was reacted with sufficient sodium 3-chloro-2-hydroxypropanesulfonate to replace all these amino hydrogen atoms with sulfonate groups, in which case the product was N-(2-hydroxyethyl)-N,N',N'-tris(2-hydroxy-3-sulfopropyl)ethylenediamine, trisodium salt.

The products of Examples 1–3 are compared in iron chelating capacity over a range of pH levels with the commercially available trisodium N-(2-hydroxyethyl)ethylenediaminetriacetate in Table I. The values for chelated iron were determined by colorimetric analysis as in Example 1.

TABLE I

| Ex. No. | HPS*/CM | g./millimoles Fe/millimole amine, pH = | | | | | |
|---|---|---|---|---|---|---|---|
| | | 7 | 9 | 10 | 11 | 12 | 13 |
| 1 | 2/1 | 0.71 | 0.42 | 0.47 | 0.45 | 0.58 | 0.66 |
| 2 | 1/2 | 0.85 | 0.69 | 0.75 | 0.72 | 0.55 | 0.41 |
| 3 | 3/0 | 0.01 | 0.04 | 0.06 | 0.10 | 0.20 | 0.43 |
| A | 0/3 | 0.80 | 0.82 | 0.82 | 0.82 | 0.10 | 0.09 |

*HPS and CM refer respectively to 2-hydroxy-3-sulfopropyl and carboxymethyl substituents present as sodium salts in the diamine molecule.

EXAMPLES 4–9

The procedure described in Example 1 was used to synthesize similar compounds having various proportions of sulfonate and carboxymethyl substituents on the nucleus of mono and dihydroxyethylated diethylenetriamines as the starting polyamine. These compounds were also mixtures of the possible isomers as before. Also prepared by the same general procedure for purposes of comparison were analogous compounds having either no hydroxyethyl groups or no sulfonate groups in their structure. Iron chelating capacities for these compounds are listed as before in Table II.

TABLE II

| Ex. No. | Substituents | | g. mmoles Fe/g mmole amine, pH = | | | | | |
|---|---|---|---|---|---|---|---|---|
| | HE* | HPS | CM | 7 | 9 | 10 | 11 | 12 | 13 |
| 4 | 1 | 1 | 3 | 0.53 | 0.52 | 0.50 | 0.42 | 0.31 | 0.20 |
| 5 | 1 | 2 | 2 | 0.64 | 0.60 | 0.59 | 0.54 | 0.45 | 0.43 |
| 6 | 1 | 3 | 1 | 0.40 | 0.55 | 0.55 | 0.59 | 0.54 | 0.61 |
| 7 | 2 | 1 | 2 | 0.62 | 0.52 | 0.39 | 0.44 | 0.29 | 0.29 |
| 8 | 2 | 2 | 1 | 0.35 | 0.49 | 0.52 | 0.44 | 0.47 | 0.54 |
| 9 | 2 | 3 | 0 | 0.17 | 0.37 | 0.38 | 0.37 | 0.41 | 0.53 |
| B | 0 | 1 | 4 | 0.31 | 0.24 | 0.23 | 0.22 | 0.09 | 0 |
| C | 0 | 2 | 3 | 0.47 | 0.43 | 0.43 | 0.36 | 0.32 | 0.15 |
| D | 0 | 3 | 2 | 0.54 | 0.54 | 0.52 | 0.49 | 0.37 | 0.29 |
| E | 1 | 0 | 4 | 0.50 | 0.50 | 0.50 | 0.22 | 0.05 | 0 |
| F | 2 | 0 | 3 | 0.50 | 0.50 | 0.50 | 0.44 | 0.15 | 0.05 |

*HE = 2-hydroxyethyl

In Tables I and II above, it is clearly evident that the compounds of this invention generally have better or more uniform capacity for chelating iron, particularly at high pH levels, as compared to otherwise similar compounds which lack either a hydroxyalkyl substituent or a 2-hydroxy-3-sulfopropyl group.

We claim:

1. A compound having the formula

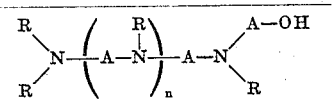

wherein $n$ is 0–5, A is an alkylene radical of two to three carbon atoms, and each R is a carboxymethyl, a 2-hydroxy-3-sulfopropyl, or an —A—OH radical, and at least one R is a 2-hydroxy-3-sulfopropyl radical.

2. The compound of claim 1 wherein A is an ethylene radical.

3. The compound of claim 2 wherein $n$ is 0.

4. The compound of claim 3 wherein one R is a carboxymethyl radical and the other two R's are 2-hydroxy-3-sulfopropyl radicals.

5. The compound of claim 3 wherein one R is a 2-hydroxy-3-sulfopropyl radical and the other two R's are carboxymethyl radicals.

6. The compound of claim 2 wherein $n$ is 1.

7. The compound of claim 6 wherein one R is hydroxyethyl, two R's are 2-hydroxy-3-sulfopropyl radicals, and two R's are carboxymethyl radicals.

8. The compound of claim 6 wherein one R is hydroxyethyl, three R's are 2-hydroxy-3-sulfopropyl radicals, and one R is carboxymethyl.

* * * * *